United States Patent
Cai et al.

(10) Patent No.: US 10,831,557 B2
(45) Date of Patent: *Nov. 10, 2020

(54) TASK MANAGEMENT USING A VIRTUAL NODE

(71) Applicant: International Business Machines Corporation, Armonk, NY (US)

(72) Inventors: Lin Cai, Shanghai (CN); Di Ling Chen, Beijing (CN); Ting SH Li, Shanghai (CN); Yiming Yin, Shanghai (CN); Chenghui Chen, Beijing (CN); Ming Yang, Shanghai (CN); Dong Wen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/289,462

(22) Filed: Feb. 28, 2019

(65) Prior Publication Data

US 2020/0278889 A1 Sep. 3, 2020

(51) Int. Cl.
*G06F 9/455* (2018.01)
*G06F 9/50* (2006.01)
*G06F 9/48* (2006.01)

(52) U.S. Cl.
CPC ........ *G06F 9/5077* (2013.01); *G06F 9/45558* (2013.01); *G06F 9/4881* (2013.01);
(Continued)

(58) Field of Classification Search
CPC .. G06F 9/5077; G06F 9/45558; G06F 9/4881; G06F 2009/4557; G06F 2009/45595
See application file for complete search history.

(56) References Cited

U.S. PATENT DOCUMENTS 8,209,415 B2 6/2012 Wei
8,307,177 B2 * 11/2012 Prahlad ............... G06F 11/1453
711/162

(Continued)

OTHER PUBLICATIONS

Patil, Shital et al. "Improving Performance Guarantees in Cloud Computing through Efficient and Dynamic Task Scheduling". International Journal of Advanced Computer Research. vol. 2 No. 4 Issue 6. (Year: 2012).*

(Continued)

*Primary Examiner* — Adam Lee
(74) *Attorney, Agent, or Firm* — Peter K. Suchecki

(57) ABSTRACT

Provided is a method, system, and computer program product for managing tasks in a computing system using a virtual node. A processor may register a virtual node for handling tasks allocated by a scheduling node in a computing system, the computing system comprising the scheduling node and a group of actual computing nodes processing tasks allocated by the scheduling node, and the scheduling node takes the virtual node as an actual computing node. A performance level of the computing system is obtained. Capacity of the virtual node is set based on the obtained performance level, such that the scheduling node allocates tasks to the virtual node based on the capacity of the virtual node. In response to at least one task being allocated by the scheduling node to the virtual node, the at least one task is received by the virtual node.

12 Claims, 10 Drawing Sheets

(52) U.S. Cl.
CPC ........... *G06F 2009/4557* (2013.01); *G06F 2009/45595* (2013.01)

(56) References Cited

U.S. PATENT DOCUMENTS

| | | | | |
|---|---|---|---|---|
| 8,996,932 | B2 | 3/2015 | Singh et al. | |
| 9,253,064 | B2 | 2/2016 | Brown | |
| 9,292,371 | B1 | 3/2016 | Clifford | |
| 9,524,389 | B1* | 12/2016 | Roth | G06F 21/554 |
| 9,665,445 | B1* | 5/2017 | Acharya | G06F 3/065 |
| 2009/0199175 | A1* | 8/2009 | Keller | G06F 8/61 717/178 |
| 2011/0134761 | A1* | 6/2011 | Smith | H04L 43/0852 370/252 |
| 2012/0060171 | A1* | 3/2012 | Bobroff | G06F 9/505 718/105 |
| 2015/0212840 | A1* | 7/2015 | Biran | G06F 9/5077 718/1 |
| 2015/0301869 | A1* | 10/2015 | Chan | G06F 9/5088 718/105 |
| 2017/0149660 | A1* | 5/2017 | Shu | H04L 47/28 |
| 2017/0185450 | A1* | 6/2017 | Le Bars | H04N 19/426 |
| 2017/0302572 | A1* | 10/2017 | Izhak-Ratzin | H04L 41/0893 |
| 2018/0107522 | A1* | 4/2018 | Wilson | G06F 9/45558 |
| 2019/0274081 | A1* | 9/2019 | Furuichi | H04W 88/08 |

OTHER PUBLICATIONS

Cai et al., "Task Management Using a Virtual Node," U.S. Appl. No. 16/512,479, filed Jul. 16, 2019.
List of IBM Patents or Patent Applications Treated as Related, Jul. 15, 2019, 2 pgs.
Github, "Kubemark User Guide," https://github.com/eBay/Kubernetes/blob/master/docs/devel/kubemark-guide.md, Nov. 25, 2015, printed Jan. 3, 2019, 4 pgs.
Kubenetes, "Advanced Scheduling in Kubernetes," https://kubernetes.io/blog/2017/03/advanced-scheduling-in-kubernetes/, Mar. 31, 2017, printed Jan. 3, 2019, 7 pgs.
Mell et al., "The NIST Definition of Cloud Computing," Recommendations of the National Institute of Standards and Technology, U.S. Department of Commerce, Special Publication 800-145, Sep. 2011, 7 pgs.
Unknown, "Auto-repairing nodes," https://cloud.google.com/kubernetes-engine/docs/how-to/node-auto-repair, Google Cloud, Kubernetes Engine, last updated Sep. 25, 2018, 3 pgs.
Wang et al., "Approaches for Resilience Against Cascading Failures in Cloud Datacenters," https://ieeexplore.ieee.org/abstract/document/8416337/similar#similar, 2018 IEEE 38th International Conference on Distributed Computing Systems, Jul. 2-6, 2018, pp. 706-717.

* cited by examiner

TASK MANAGEMENT USING A VIRTUAL NODE

BACKGROUND

The present disclosure relates generally to managing tasks within distributed computing systems, and more specifically, to mitigating cascade failures by managing tasks using a virtual node.

With the development of distributed computing, tasks may be distributed by a scheduling node to multiple actual computing nodes included in the distributed computing system. During operations of the distributed computing system, states of the multiple actual computing nodes may vary due to their hardware and software configurations. An actual computing node may be a physical computer or a virtual machine which is running on a physical computer and sharing resources with other virtual machines. In a cloud system, either the physical computer or the virtual machine can be a node that handles processing tasks. A virtual node may be an application that mimics a node. However, the virtual node may not handle processing actual tasks.

SUMMARY

Embodiments of the present disclosure include a computer-implemented method for mitigating cascade failures by managing tasks using a virtual node. According to the method, a virtual node is registered for handling tasks allocated by a scheduling node in a computing system, the computing system comprises the scheduling node and a group of actual computing nodes processing tasks allocated by the scheduling node, and the scheduling node takes the virtual node as an actual computing node. A performance level of the computing system is obtained. Capacity of the virtual node is set based on the obtained performance level, such that the scheduling node allocates tasks to the virtual node based on the capacity of the virtual node. In response to at least one task being allocated by the scheduling node to the virtual node, the at least one task is received.

Embodiments of the present disclosure include a computer-implemented system for mitigating cascade failures by managing tasks using a virtual node. The computing system comprises a computer processor coupled to a computer-readable memory unit, where the memory unit comprises instructions that when executed by the computer processor implements the above method.

Embodiments of the present disclosure may be directed toward a computer program product for mitigating cascade failures by managing tasks using a virtual node. The computer program product comprises a computer readable storage medium having program instructions embodied therewith. The program instructions are executable by a processor to cause the processor to perform actions of the above method.

Further aspects of the present disclosure are directed toward a system and computer program product with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
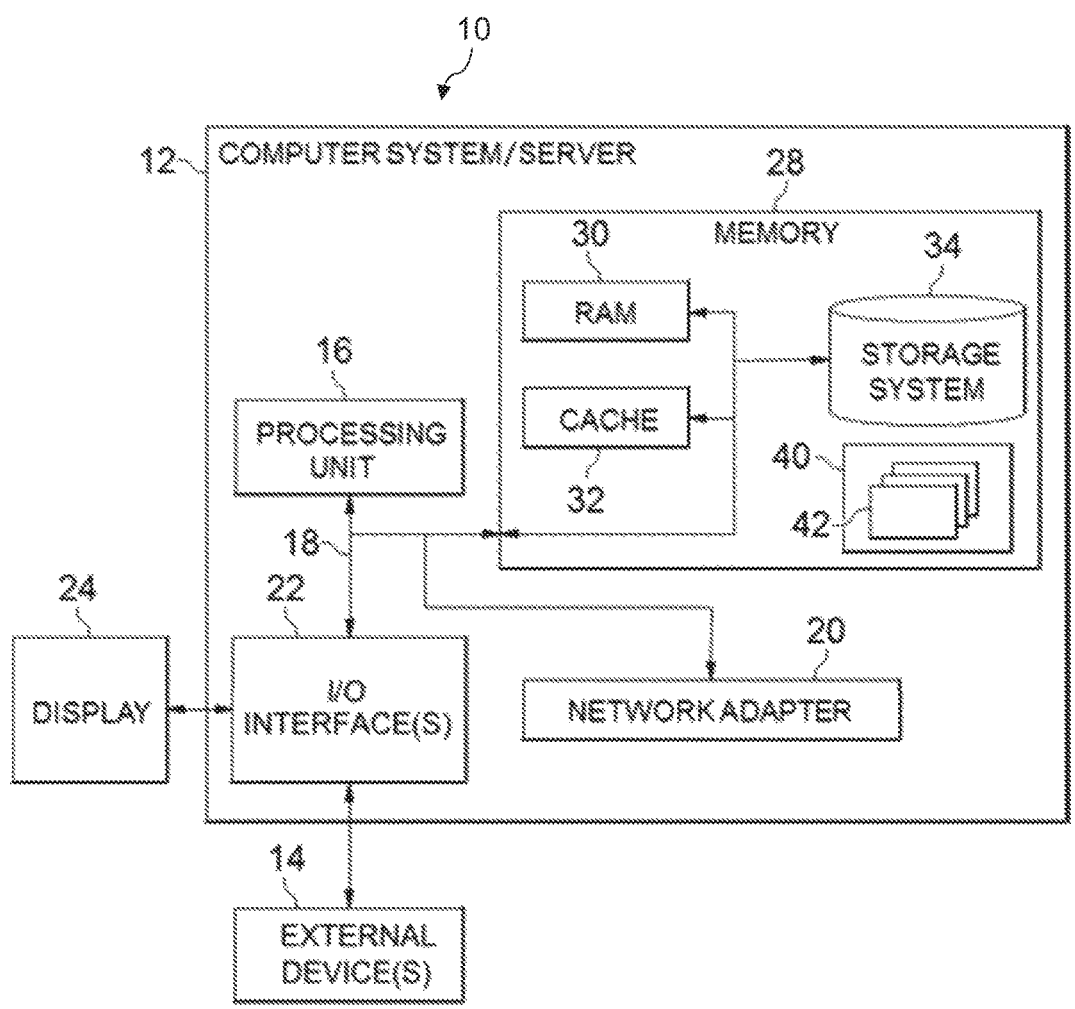
FIG. 1 depicts a cloud computing node according to an embodiment of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to managing tasks within distributed computing systems, and more specifically, to mitigating cascade failures by managing tasks using a virtual node. While not limited to such applications, embodiments of the present disclosure may be better understood in light of the aforementioned context.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
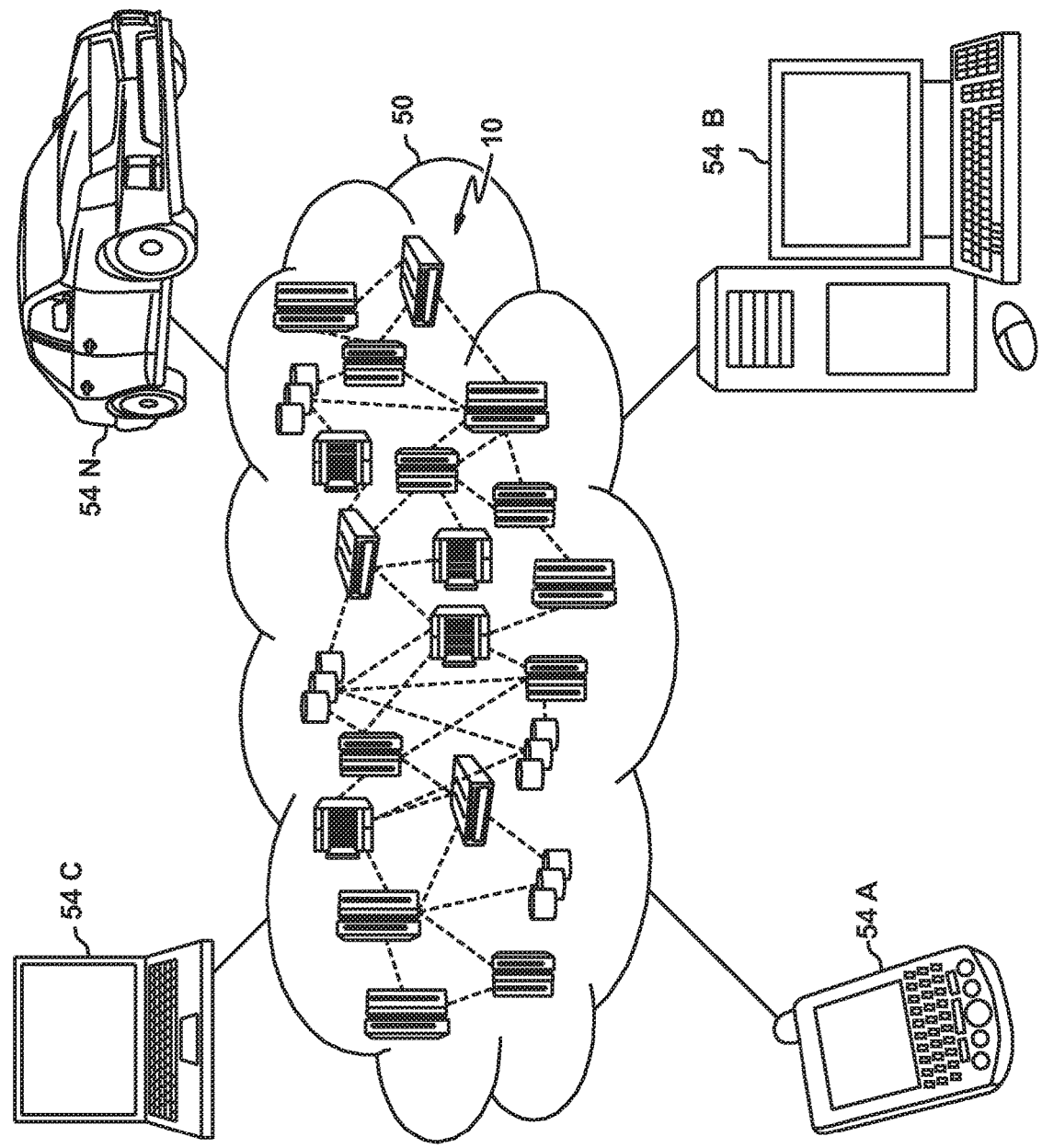
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
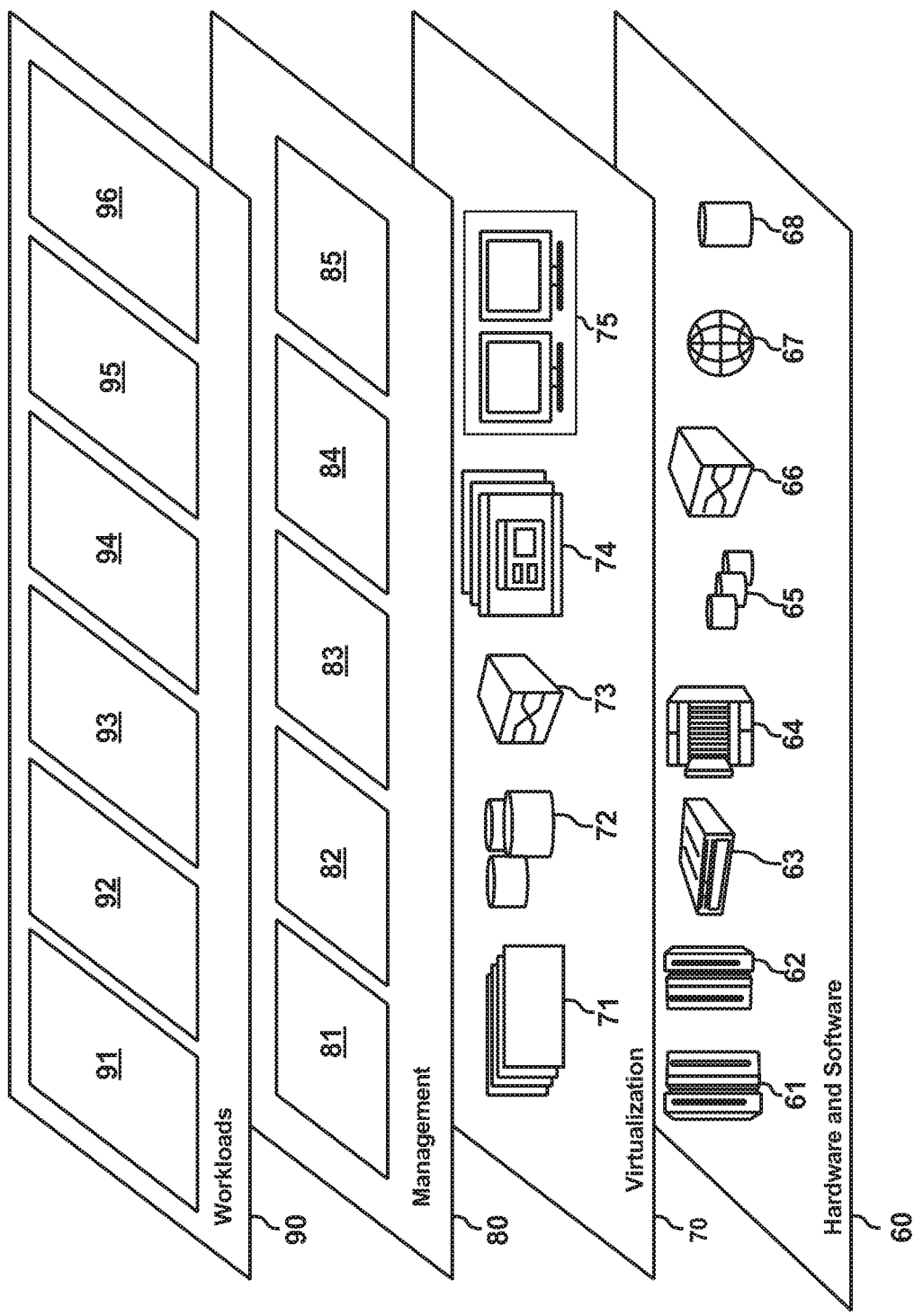
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task management 96.

It should be noted that the processing of task management according to embodiments of this disclosure could be implemented by computer system/server 12 of FIG. 1. Hereinafter, reference will be made to FIG. 4 to FIG. 10 to describe details of the task management 96.

Sometimes, when performance of a computing node degrades or a failure occurs in the computing node in a distributed computing system, tasks that have been allocated to the computing node should be re-distributed to other normal computing nodes. At this point, workloads of the other normal computing nodes may increase and performance of the computing system may be affected.

Figure 4:
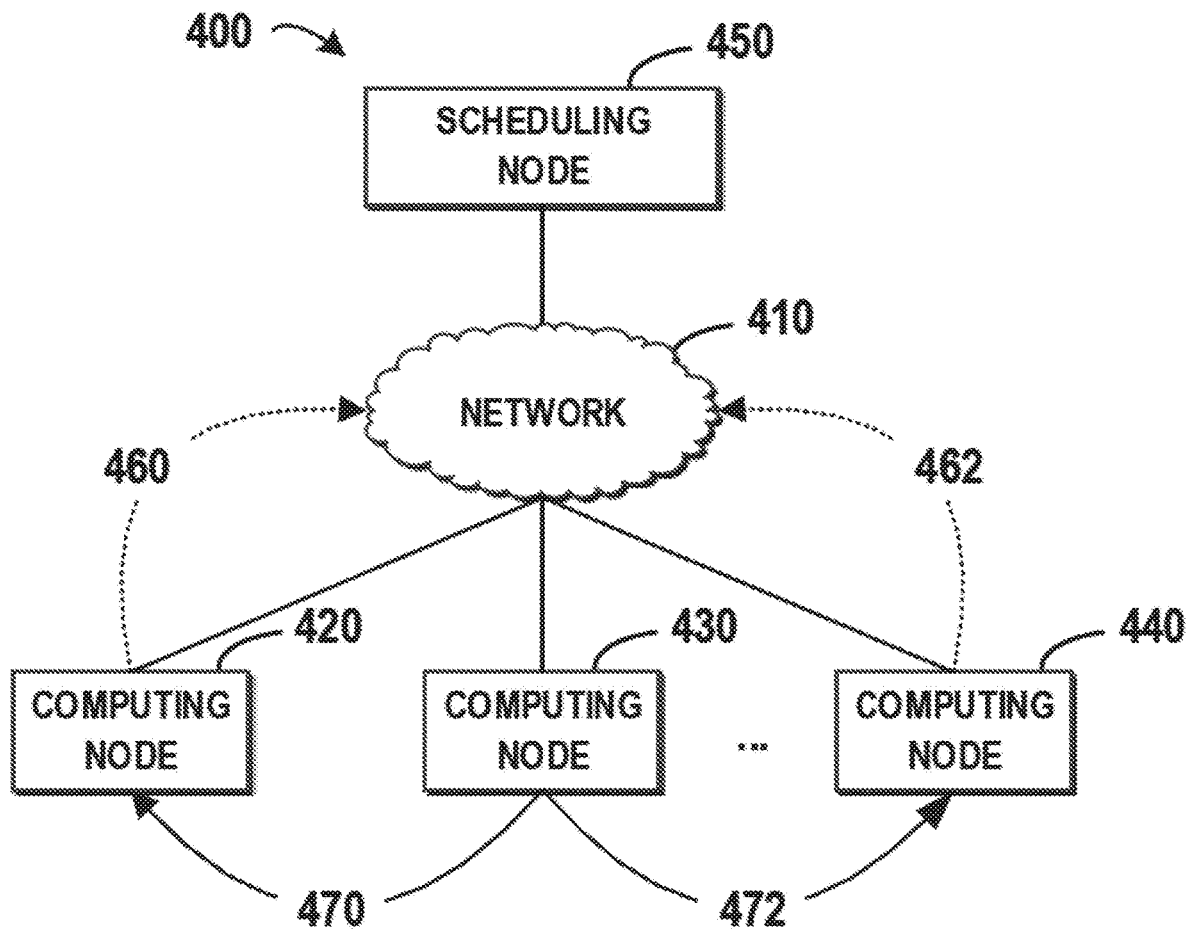
FIG. 4 depicts an example computing system comprising multiple actual computing nodes and a scheduling node according to an existing solution, in accordance with embodiments of the present disclosure.

For the sake of description, embodiments of the present invention will be described in an environment of a distributed computing system in FIG. 4. In the context of the present disclosure, a distributed computing system may also be referred to as a computing system. FIG. 4 depicts an example distributed computing system 400, and the computing system 400 may comprise a scheduling node 450 and a group of actual computing nodes 420, 430, . . . , and 440. Here, the scheduling node 450 and the group of actual computing nodes 420, 430, . . . , and 440 may be connected via a network 410. It is to be understood that the scheduling node 450 and the actual computing nodes 420, 430, . . . , and 440 may be implemented by physical devices, logical devices or a combination thereof. The computing system 400 may receive requests from users through a user interface (not shown in FIG. 4) on the scheduling node 450 or anyone from the actual computing nodes 420, 430, . . . , and 440. Then, the scheduling node 450 may allocate tasks initiated by the requests to one or more nodes in the group of actual computing nodes 420, 430, . . . , and 440.

Sometimes, a failure may occur in the computing system 400. For example, the actual computing node 430 may fail due to a peak workload or an exception in the software or hardware configuration in the actual computing node 430, and the like. As depicted by arrows 470 and 472, the tasks that have been previously allocated to the abnormal computing node 430 may be re-allocated to other normal computing nodes 420 and 440, respectively. Therefore, performance of the actual computing nodes 420 and 440 may be decreased as they handle the additional tasks from failed computing node 430. If the actual computing nodes 420 and 440 cannot process the re-allocated tasks within a reasonable time period, they may transfer the tasks to other actual computing nodes via the network 410 (as depicted by arrows 460 and 462), which may cause a cascading re-allocation of the tasks among the actual computing nodes and may result in a low performance of the computing system 400.

There are some proposed solutions for managing tasks in the computing system 400. According to one solution, powerful hardware may be deployed in the actual computing nodes to extend the processing capability of the computing nodes during a peak time. However, this solution increases the cost as the powerful processing capability is wasted during a normal operation of the computing system 400. According to another solution, a scheduling mechanism for the scheduler 450 may be modified to alleviate effects of task re-allocation. However, this solution is difficult to be implemented because it requires modifying implementations of the scheduling node 450 and also affects implementations of the actual computing nodes 420, 430, . . . , and 440.

Figure 5:
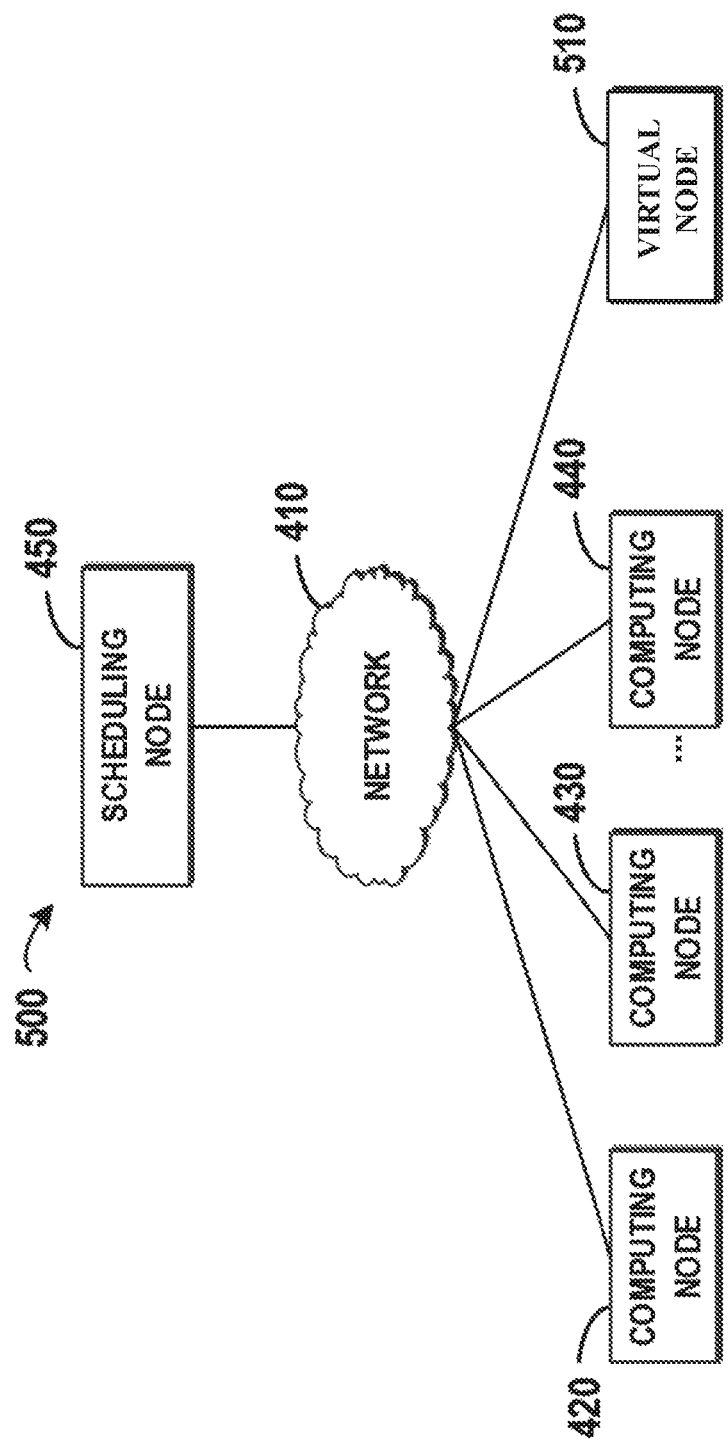
FIG. 5 depicts an example diagram for managing tasks in a computing system comprising a virtual node, in accordance with embodiments of the present disclosure.

In view of the above, the present disclosure provides a solution for managing tasks in the computing system. Hereinafter, reference will be made to FIG. 5 for a general description of embodiments of the present disclosure. FIG. 5 depicts an example diagram for managing tasks in a computing system 500 comprising a virtual node 510, in accordance with embodiments of the present disclosure. As illustrated in FIG. 5, the scheduling node 450, the actual computing nodes 420, 430, . . . , and 440 are the same as those in the computing system 400 in FIG. 4. Further, a virtual node 510 may register into the computing system 500. Here, the virtual node 510 may be a dumb node implemented by an application imitating some or all of the behaviors of an actual computing node.

For example, the virtual node 510 may exhibit its processing resources (such as a processor) and memory resources (such as a memory) for processing tasks to the scheduling node 450, such that the scheduling node 450 may treat the virtual node 510 as an actual computing node and allocate task(s) to the virtual node 510. Here, from the perspective of the scheduling node 450, the virtual node 510 may be used to handle at least one task that is to be allocated by the scheduling node 450 in the computing system 500. However, the virtual node 510 only accepts task(s) allocated to itself and keeps the allocated task(s) in a storage, but it does not really process the allocated task(s).

In the above embodiments of the present disclosure, by accepting the registration of the virtual node 510 for the computing system 500, implementations of the other computing nodes 420, 430, . . . , and 440 and the scheduling node 450 do not need to be modified. Accordingly, this embodiment provides an easy and effective way for managing tasks in the computing system 500. Moreover, the virtual node 510 may absorb excessive tasks that cannot be processed by the actual computing nodes 420, 430, . . . , and 440. Therefore, the performance of the actual computing nodes 420, 430, . . . , and 440 may not be interfered with by the excessive tasks.

Figure 6:
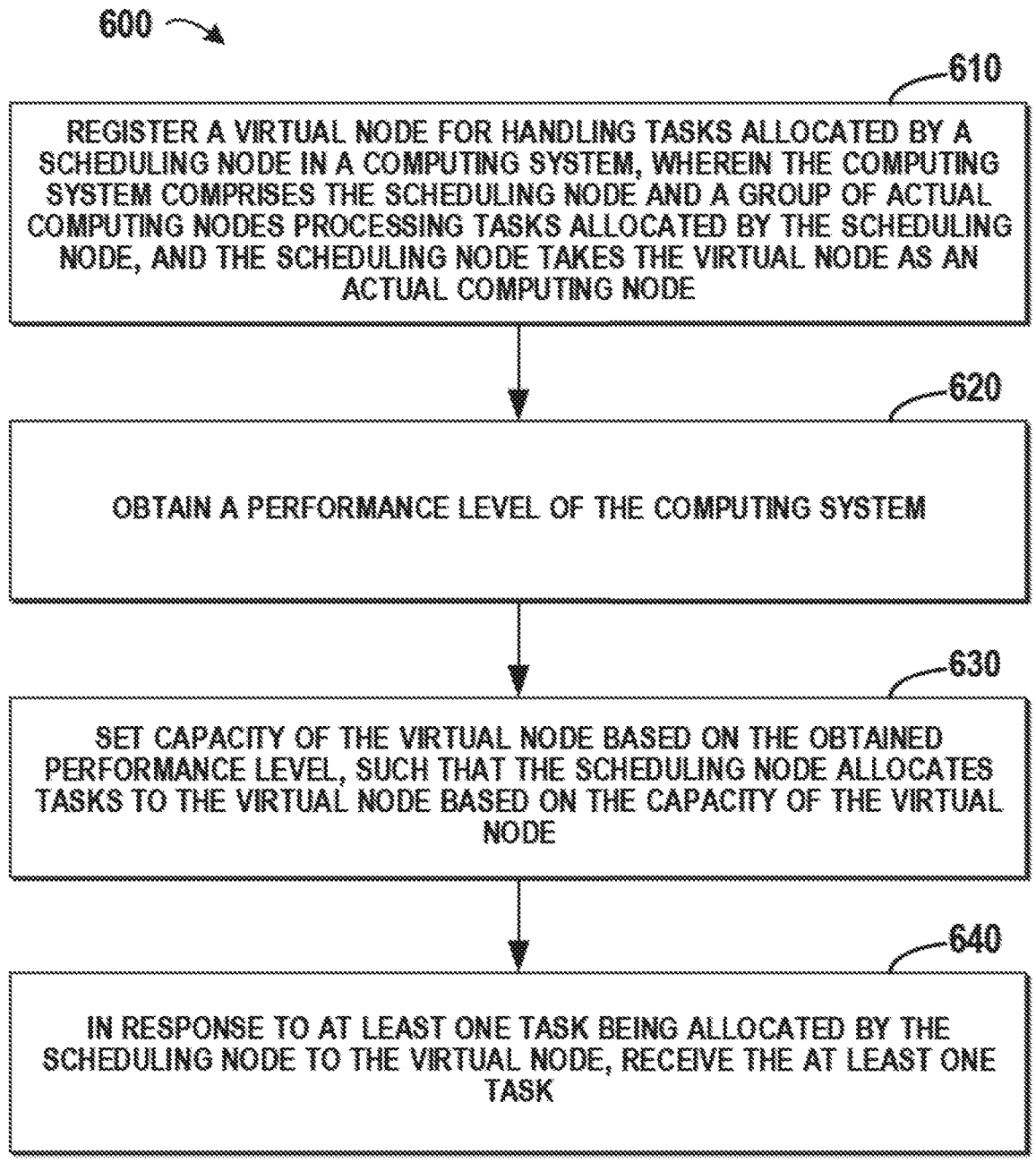
FIG. 6 depicts an example flowchart of a method for managing tasks, in accordance with embodiments of the present disclosure.

Hereinafter, reference will be made to FIG. 6 for details of the present disclosure. FIG. 6 depicts an example flowchart of a method 600 for managing tasks, in accordance with embodiments of the present disclosure. At block 610, the virtual node 510 may register with the scheduling node 450 for handling at least one task that is to be allocated by the scheduling node 450 in the computing system 500. Here, the computing system 500 may comprise the scheduling node 450 and a group of actual computing nodes 420, 430, . . . , and 440 processing tasks allocated by the scheduling node 450.

In this embodiment, the virtual node 510 may be implemented by an individual application that is installed on a computing device. For example, the application may be installed on any of the actual computing nodes, the scheduling node 450, or another device. In another embodiment, the virtual node 510 may be implemented by a procedure in an application for managing the tasks in the computing system 500. Here, the application may be implemented on any of a physical device or a logical device, as along as the virtual node 510 can communicate with other nodes in the computing system 500. In some embodiments, the application may be launched in advance. In some embodiments, the application may be launched just before the registering step. After the registration of the virtual node, the scheduling node 450 may be notified that the virtual node 510 has joined the computing system 500. The scheduling node 450 does not need to know that the virtual node 510 is different from an actual computing node; the scheduling node 450 just allocates tasks to the virtual node as it does other actual computing nodes.

According to embodiments of the present disclosure, the virtual node 510 may work as an actual computing node from the perspective of the scheduling node, although the virtual node 510 itself does not really process any task. The virtual node 510 may exhibit capacity to the outside and make the scheduling node 450 believe that it is able to process task(s) allocated to it. The capacity may comprise various aspects of the workload declared by the virtual node 510, such as usage of processing resources and memory resources, and the like. In some embodiments, the capacity may be represented by a usage ratio of processing resources, memory resources, or a combination thereof. Based on the declared capacity, the scheduling node 450 may allocate tasks among the group of actual computing nodes 420, 430, . . . , and 440 and the virtual node 450.

At block 620, a performance level of the computing system 500 may be obtained by the virtual node 510. Here, the performance level may be obtained in various ways. In some embodiments of the present disclosure, the performance level of the computing system 500 may be evaluated by average response time of the computing system 500. Specifically, the average response time may be a time duration between a starting time when the computing system 500 receives a task and an ending time when the scheduling node 450 allocates the received task to at least one specific computing node and the at least one specific computing node finishes processing the received task.

According to embodiments of the present disclosure, the average response time may be determined based on historical operations of the computing system 500. In one example, if the computing system 500 allocated 100 tasks to the group of computing nodes in the computing system 500, and the group of computing nodes finish processing these tasks within 5 seconds, then the average response time may be determined as $5/100=0.05$ second. The lower the average response time is, the higher the performance level of the computing system 500 is. In another example, the performance level of the computing system 500 may be determined according to how many tasks may be processed within a certain time duration. Supposing the group of computing nodes in the computing system 500 finishes processing 100 tasks within 5 seconds, then the computing system 500 may handle $100/5=20$ tasks within one second. The lower the number of the tasks is, the lower the performance level of the computing system 500 is.

According to embodiments of the present disclosure, whether a failure occurs in any of the actual computing nodes 420, 430, . . . , and 440 may be another indicator for performance level. A failure may indicate a low performance level, while all the actual computing nodes in a healthy state may indicate a high performance level. In order to clearly reflect the performance of the computing system 500, the performance level may be determined based on the number of failed nodes and the total number of the normal computing nodes.

At block 630, the capacity of the virtual node 510 is set based on the obtained performance level, such that the scheduling node 450 allocates tasks to the virtual node 510 based on the capacity of the virtual node. As the scheduling node 450 takes the virtual node 510 as an actual computing node and the scheduling node 450 allocates tasks to respective computing nodes 420, 430, . . . , and 440 based on respective capacity of the actual computing nodes, the capacity of the virtual node 510 may be adjusted so as to control task(s) allocated by the schedule node 450. At block 640, the virtual node 510 may receive task(s) allocated by the scheduling node 450.

Figure 7:
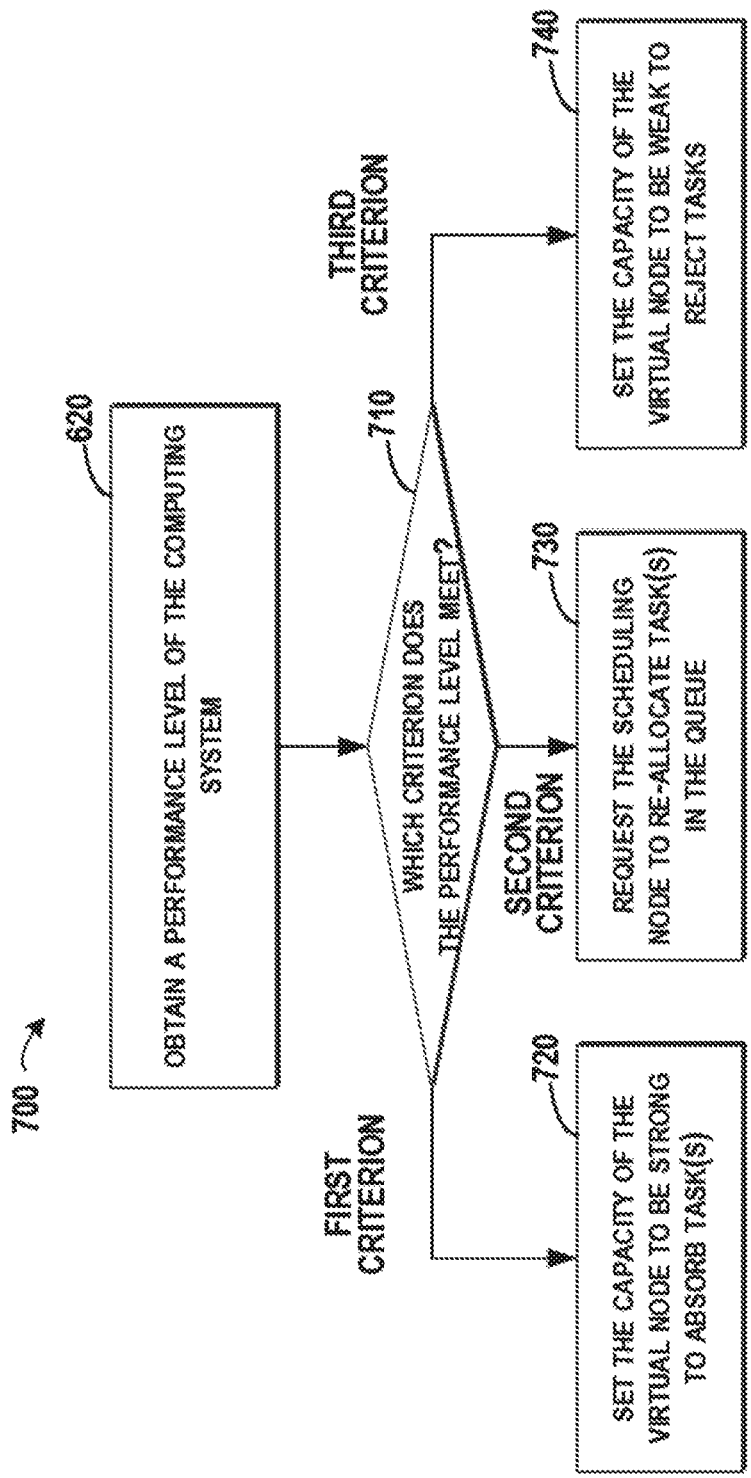
FIG. 7 depicts an example method for management of the virtual node based on performance information of a computing system, in accordance with embodiments of the present disclosure.

Reference will be made to FIG. 7 for illustrating how to set the capacity of the virtual node 510 based on the performance level of the computing system 500. FIG. 7 depicts an example method 700 for management of the virtual node 510 based on performance level of the computing system 500, in accordance with embodiments of the present disclosure. Operations at block 620 in FIG. 7 are the same as that shown in FIG. 6, and blocks 720, 730 and 740 provide detailed operations for setting the capacity of the virtual node 510. At block 710, it may be determined which criterion the performance level meets.

According to embodiments of the present disclosure, if the obtained performance level meeting a first criterion indicates a low performance level of the computing system 500, the capacity of the virtual node 510 may be set to be strong, such that the scheduling node 450 may allocate tasks to the virtual node. Referring to FIG. 7, if the performance level meets the first criterion indicating a low performance level of the computing system 500, then the method 700 may proceed to block 720.

At block 720, the capacity of the virtual node 510 may be set to be strong, such as a better value to absorb task(s). In one embodiment, the capacity of the virtual node 510 may be set to a level better than capacity of at least one of the group of computing nodes 420, 430, . . . , and 440, such that the scheduling node 450 preferably allocates tasks to the virtual node 510 other than to the actual computing nodes. Once the capacity of the virtual node 510 is set to a level better than those of all the actual computing nodes, the virtual node 510 may attract more tasks allocated by the scheduling node 450.

With these embodiments of the present disclosure, the virtual node 510 with strong capacity may attract more tasks allocated by the scheduling node 450 to it. Therefore, the actual computing nodes 420, 430, . . . , and 440 may continue work on processing the previously allocated tasks without a need to worry about a drop in their capacity. In this way, the normal operations of the actual computing nodes 420, 430, . . . , and 440 may not be disturbed.

Continuing the above example for representing the performance of the computing system 500 by the average response time, the first criterion may be associated with a threshold time duration. Supposing a response time longer than 0.05 second is unacceptable to the user, then 0.05 second may be selected as the threshold. If the average response time of the computing system 500 is above 0.05 second, then the virtual node 510 may be set to have strong capacity, which indicates that the virtual node 510 is an idle computing node that can be allocated tasks. At this point, the scheduling node 450 may allocate more tasks to the virtual node 510, thereby reducing the number of tasks assigned to the actual computing nodes and allowing the actual computing nodes to process their tasks more efficiently.

Figure 8:
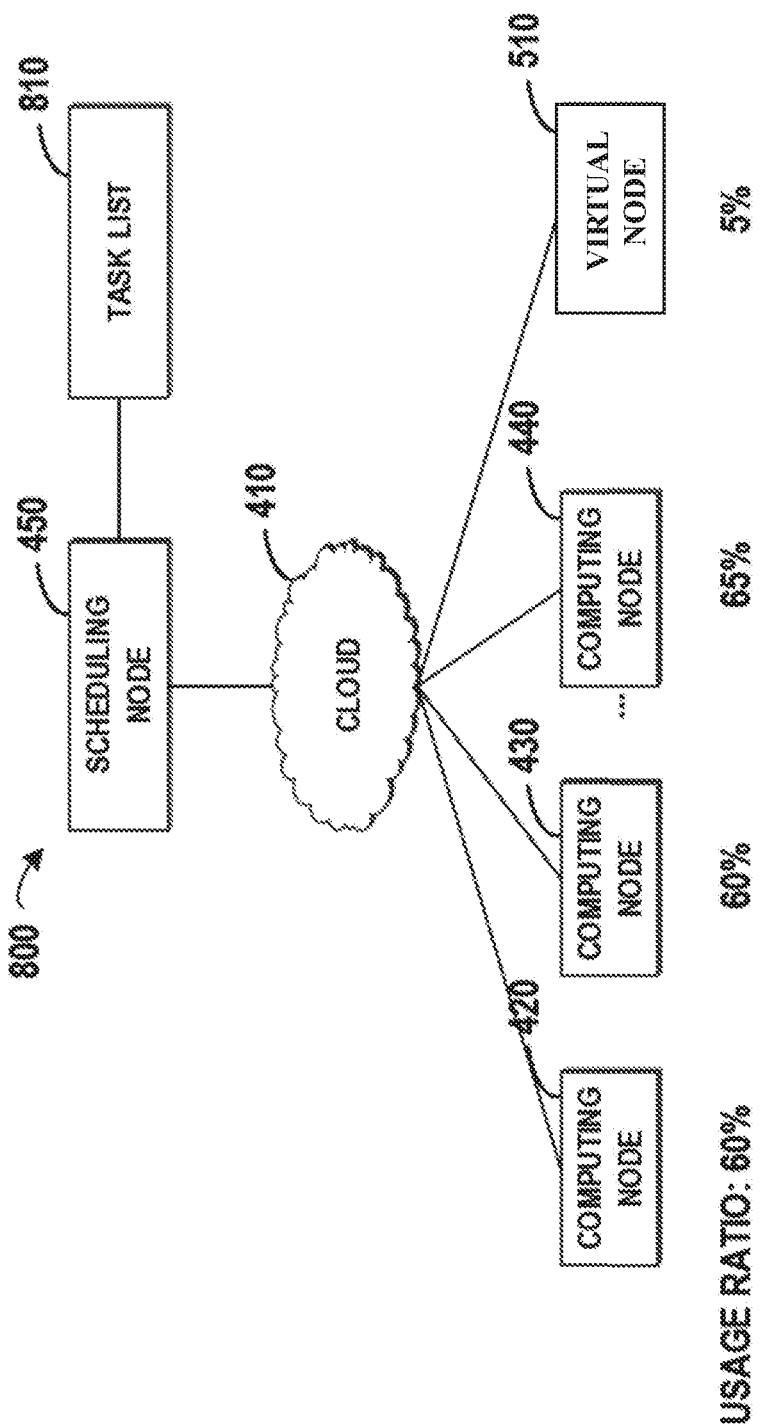
FIG. 8 depicts an example diagram for setting capacity for the virtual node, in accordance with embodiments of the present disclosure.

Reference now to FIG. 8, depicted is an example diagram 800 for setting capacity for the virtual node, in accordance with embodiments of the present disclosure. The example diagram 800 shows a situation where the capacity is represented by a usage ratio of the processing resource as described above. As the actual computing nodes 420, 430, . . . , and 440 are busy in processing tasks allocated to them, their usage ratio may be high, for example, 60%, 60%, . . . , and 65%. At this point, the usage ratio of the virtual node 510 may be set to 5% or another low value to indicate strong capacity. During the operations of the computing system 500, the usage ratio of both the virtual node 510 and the actual computing nodes 420, 430, . . . , and 440 may be collected. As the usage ratio of 5% is much lower than 60%, 60%, . . . , and 65%, the scheduling node 450 may allocate the newly received tasks to the virtual node 510 instead of allocating them to any of the actual computing nodes 420, 430, . . . , and 440.

Figure 9:
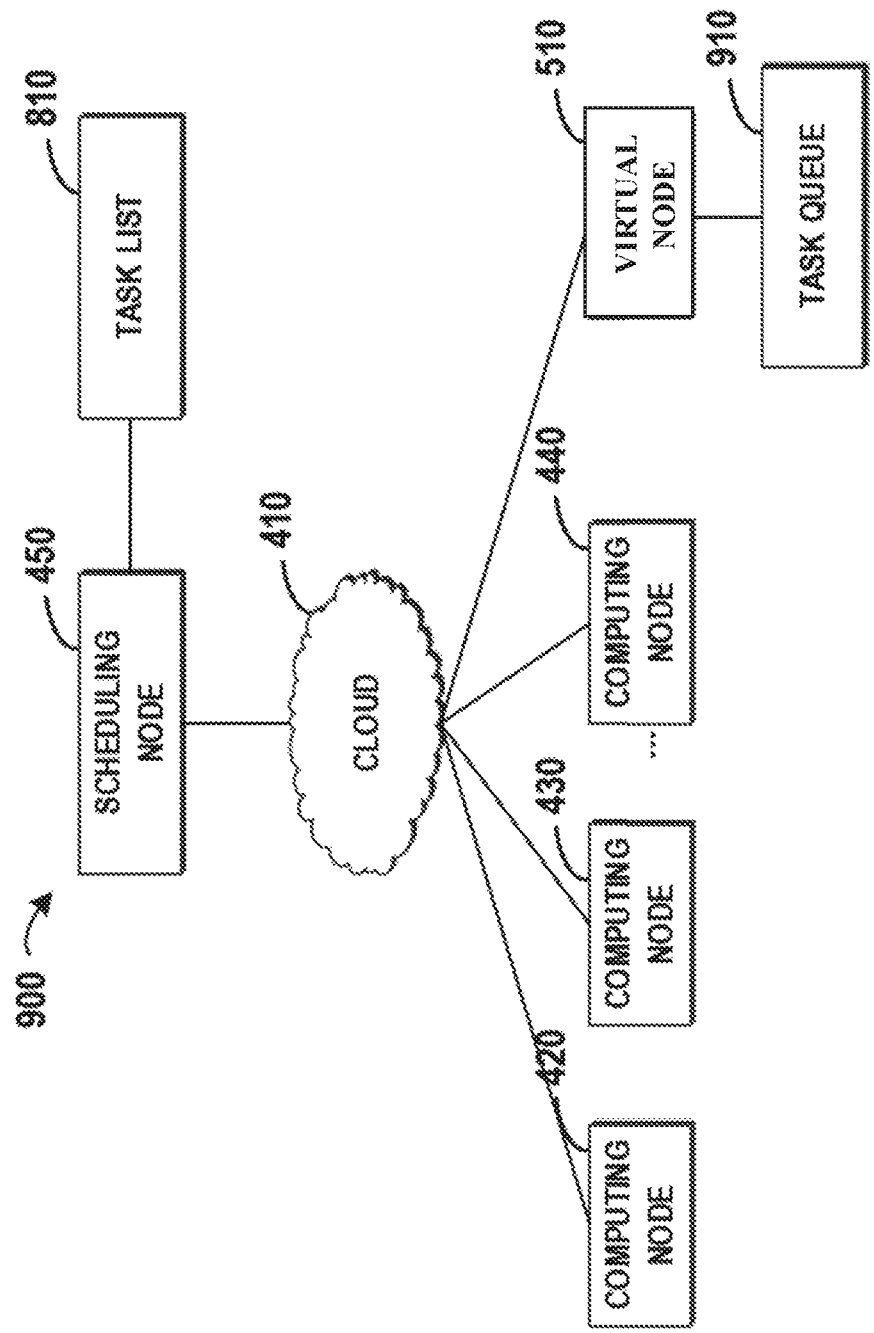
FIG. 9 depicts an example diagram for holding a task in a task queue associated with the virtual node, in accordance with embodiments of the present disclosure.

According to embodiments of the present disclosure, once a task is allocated to the virtual node 510 by the scheduling node 450, the received task may be held in a queue associated with the virtual node 510. Reference will be made to FIG. 9 for details, where FIG. 9 depicts an example diagram 900 for holding tasks in a task queue 910 associated with the virtual node 510, in accordance with embodiments of the present disclosure. When the capacity of the virtual node 510 is better than any of the other computing nodes 420, 430, . . . , and 440, the scheduling node 450 may continuously allocate tasks in the task list 810 to the virtual node 510. Once the virtual node 510 receives tasks, the virtual node 510 may hold the received tasks in the task queue 910.

It is to be understood that the term "hold" means that the task is just stored in the task queue 910 without really being processed by the virtual node 510. Here, the task queue 910 is a storage space for holding the excessive tasks that cannot be processed by the actual computing nodes 420, 430, . . . , and 440 at the present time. Once the performance of the computing system 500 returns to a normal level, the tasks in the task queue 910 may be re-allocated to the actual computing nodes 420, 430, . . . , and 440.

According to embodiments of the present disclosure, if the obtained performance level meeting a second criterion for indicating both a normal performance level of the computing system and at least one task held in the virtual node, the scheduling node 450 may be requested to re-allocate tasks allocated to the virtual node 510 to other actual computing node(s). Referring back to FIG. 7, at block 710, if the obtained performance level meets a second criterion that indicates an improvement in the performance of the computing system 500 (e.g., a normal performance level), and at least one task is held in the virtual node, the method 700 may proceed to block 730. At block 730, the scheduling node 450 may be requested to re-allocate tasks in the queue 910. Then tasks in the task queue 910 may be released such that the released tasks are re-allocated by the scheduling node 450 among the group of actual computing nodes 420, 430, . . . , and 440.

According to embodiments of the present disclosure, during the re-allocation, tasks in the task queue 910 may be released gradually, for example, one by one. In some embodiments, the tasks in the task queue 910 may be released in batches. For example, 5% (or another percentage) of the tasks may be released from the task queue 910 in each batch. The performance of the computing system 500 may be periodically obtained by the virtual node. When the obtained performance level still meets the second criterion, more tasks may be released from the task queue 910. Once the obtained performance level does not meet the second criterion (e.g., if the performance level decreases), the releasing procedure may be stopped until the performance level meets the second criterion again. The gradual releasing may prevent the excessive tasks released from the task queue 910 from impacting the performance of the computing system 500. Therefore, the performance level may be maintained at a reasonable level.

According to embodiments of the present disclosure, when the performance is indicated by the average response time, the second criterion may be associated with a second threshold lower than the first threshold. In the above example, the second threshold may be set to an average response time of 0.03 second or another value indicating an improvement of the performance. Compared with the first threshold of 0.05 second, the average response time of 0.03 becomes shorter, therefore it may indicate an improvement in the performance of the computing system 500. Accordingly, if the monitored average response time is below 0.03 second, then the method 700 may proceed to the block 730 and start to release task(s) in the task queue 910.

Figure 10:
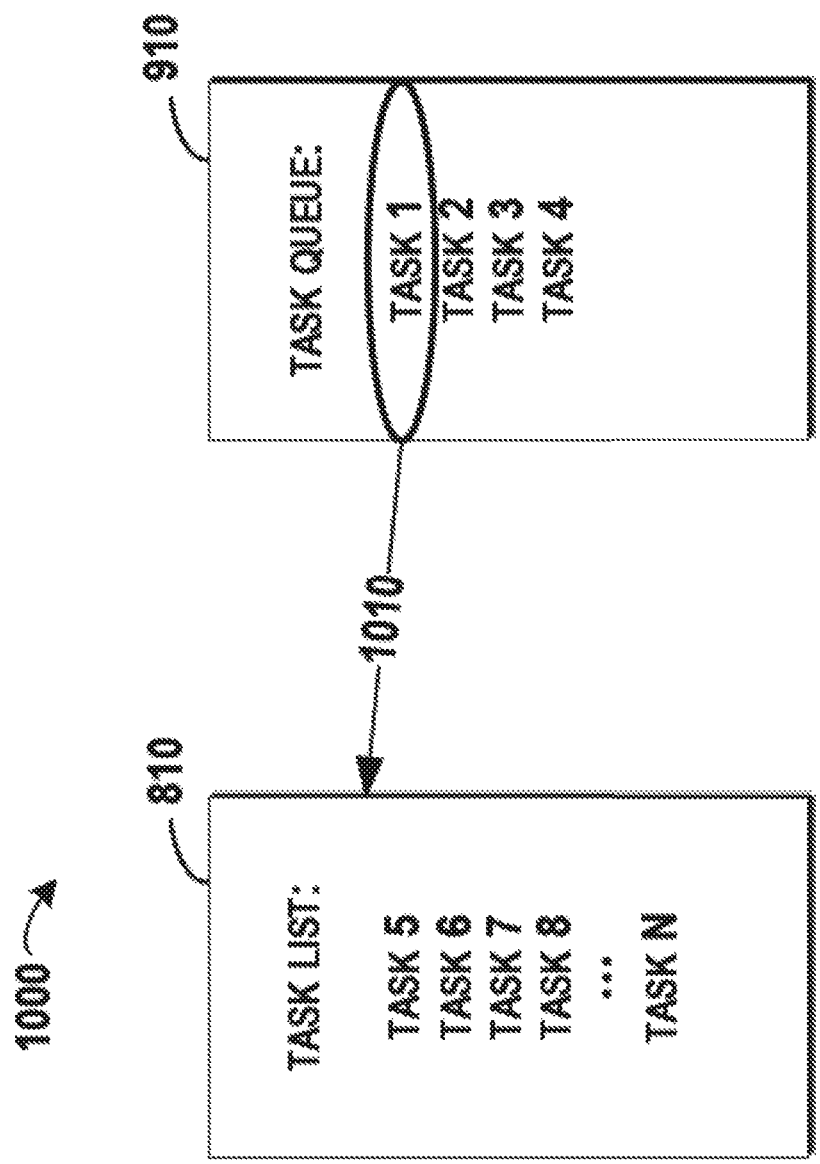
FIG. 10 depicts an example diagram for releasing a task in a task queue associated with the virtual node, in accordance with embodiments of the present disclosure.

FIG. 10 depicts an example diagram 1000 for releasing a task in the task queue 910 associated with the virtual node 510, in accordance with embodiments of the present disclosure. Referring to FIG. 10, the task list 810 of the scheduling node 450 comprises tasks 5, 6, 7, 8, . . . , N, and the task queue 910 comprises tasks 1, 2, 3, and 4. Once the average response time of the computing system 500 is less than 0.03 second, one or more tasks may be released from the task queue 910. Supposing the tasks are released one by one, task 1 may be released first, and the released task 1 may be added to the task list 810 and wait for re-allocation (as depicted by an arrow 1010).

According to embodiments of the present disclosure, task 1 may be inserted to the header of the task list 810 before task 5. According to other embodiments of the present disclosure, the released task 1 may be added at another location in the task list 810. For example, priorities may be set to each of these tasks in the task list 810 and the task queue 910, and the released task 1 may be added into the task list 810 based on the priorities. Afterwards, if the average response time is still below 0.03 second, then task 2 may be released from the task queue 910. In some embodiments, the tasks may be prioritized according to, for example, one or more of an importance of the task, a resource utilization of the task (e.g., how many processing resources are likely required to complete the task), or a time when the task was sent to the virtual node (e.g., according to a first in, first out process, a last in, first out process, etc.).

According to embodiments of the present disclosure, if the task queue 910 is empty, the virtual node 910 may be deactivated in the computing system 500. In this way, the processing and memory resources for managing the virtual node 510 may be reduced in the computing system 500. Therefore, more processing and memory resources may be available in the computing system 500, which may enhance the performance of the computing system 500. When the performance of the computing system 500 goes down, the virtual node 510 may be activated for handling further tasks. Accordingly, these embodiments may be used in situations where a performance level of a stable computing system drops temporarily.

According to embodiments of the present disclosure, the task queue 910 may be maintained during operations of the computing system 500 even if the task queue 910 is empty. As activating and deactivating the virtual node 510 may cause extra cost in the computing system 500, these embodiments may be used in situations where the performance of the computing system 500 frequently changes.

According to embodiments of the present disclosure, if the obtained performance level meets a third criterion indicating a high performance level of the computing system and no task held in the virtual node, the capacity of the virtual node 510 may be set to be weak, for example, a level worse than capacity of one of the group of computing nodes, such that tasks are prevented from being allocated to the virtual node 510 by the scheduling node 450. Referring back to FIG. 7, at block 710, if the obtained performance information meets a third criterion indicating a normal performance level of the computing system and no task held in the virtual node, the method 700 may proceed to block 740. At block 740, the capacity of the virtual node 510 may be set to be weak, for example, a worse level to reject further tasks being allocated to the virtual node 510. Specifically, the capacity of the virtual node 510 may be set to a level worse than capacity of any actual computing nodes in the group, such that tasks are prevented from being allocated to the virtual node 510 by the scheduling node 450.

Supposing a response time shorter than 0.01 second is a quick response, then 0.01 second may be selected as part of the third criterion. If the average response time of the computing system 500 is below 0.01, then the capacity of the virtual node 510 may be set to be weak, for example, a value worse than those of all the computing nodes to pretend that the virtual node 510 is weak or a busy computing node. At this point, the scheduling node 450 may allocate no task to the virtual node 510, and all the tasks are allocated to the actual computing nodes 420, 430, . . . , and 440.

When the capacity is represented by a usage ratio of the processing resource, the capacity of the virtual node 510 may be set to, for example, 95% or another high value. During the operation of the computing system 500, as the performance of the whole computing system 500 is high, the capacity of the actual computing nodes 420, 430, . . . , and 440 may be better than that of the virtual node 510. At this point, instead of allocating the newly received tasks to the virtual node 510, the scheduling node 450 may allocate the newly received tasks to one of the actual computing nodes 420, 430, . . . , and 440. With the above embodiments, the operations of the computing system 500 may be switched into a normal mode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented system, comprising a computer processor coupled to a computer-readable memory unit, the computer-readable memory unit comprising instructions that when executed by the computer processor implements a method comprising:
    registering a virtual node with a scheduling node, wherein the virtual node is configured to receive tasks allocated by the scheduling node in the computer-implemented system, wherein the the computer-implemented system further comprises the virtual node, the scheduling node, and a group of actual computing nodes processing tasks allocated by the scheduling node, and wherein the scheduling node treats the virtual node as an actual computing node;
    obtaining a performance level of the computer-implemented system based in part on an average response time of the group of actual computing nodes;
    setting a capacity of the virtual node to receive tasks from the scheduling node based on the obtained performance level of the computer-implemented system meeting a criterion, wherein the scheduling node allocates tasks to the virtual node and/or the group of actual computing nodes based on the capacity of the virtual node;
    storing, in response to at least one task being allocated by the scheduling node to the virtual node, the at least one task in the virtual node, wherein the virtual node does not process the at least one task; and
    processing, in response to at least one task being allocated by the scheduling node to the group of actual computing nodes, the at least one task by the group of actual computing nodes.

2. The computer-implemented system of claim 1, wherein when the at least one task is stored by the virtual node, re-allocating the at least on task to the group of actual computing nodes by the scheduling node.

3. The computer-implemented system of claim 1, wherein setting the capacity of the virtual node based on the obtained performance level of the computer-implemented system meeting the criterion comprises:
    setting, in response to the obtained performance level of the computer-implemented system meeting a first criterion indicating a low performance level of the group of actual computing nodes, a strong capacity to the virtual node, wherein in response to setting the strong capacity the scheduling node allocates tasks to the virtual node.

4. The computer-implemented system of claim 1, wherein setting the capacity of the virtual node based on the obtained performance level of the computer-implemented system meeting the criterion comprises:
    requesting, in response to the obtained performance level of the computer-implemented system meeting a second criterion indicating a normal performance level of the group of actual computing nodes and at least one task being held in the virtual node, the scheduling node to re-allocate the at least one task from the virtual node to the group of actual computing nodes, wherein responsive to the requesting, the scheduling node reallocates the at least one task from the virtual node to the group of actual computing nodes.

5. The computer-implemented system of claim 1, wherein setting the capacity of the virtual node based on the obtained performance level of the computer-implemented system meeting the criterion comprises:
    setting, in response to the obtained performance level of the computer-implemented system meeting a third criterion indicating a high performance level of the group of actual computing nodes and no task being held in the virtual node, a weak capacity to the virtual node, wherein in response to setting the weak capacity, preventing tasks from being allocated to the virtual node by the scheduling node.

6. The computer-implemented system of claim 1, wherein the average response time of the group of actual computing nodes is a time duration between a starting time when the computer-implemented system receives a task and an ending time when the scheduling node allocates the received task to at least one actual computing node and the at least one actual computing node finishes processing the received task.

7. A computer program product comprising a computer readable storage medium having program instructions embodied therewith, the program instructions executable by a processor to cause the processor to perform a method comprising:
    registering a virtual node with a scheduling node, wherein the virtual node is configured to receive tasks allocated by the scheduling node in a computing system, wherein the computing system comprises the virtual node, the scheduling node, and a group of actual computing nodes processing tasks allocated by the scheduling node, and wherein the scheduling node treats the virtual node as an actual computing node;
    obtaining a performance level of the computing system based in part on an average response time of the group of actual computing nodes;
    setting a capacity of the virtual node to receive tasks from the scheduling node based on the obtained performance level of the computing system meeting a criterion, wherein the scheduling node allocates tasks to the virtual node and/or the group of actual computing nodes based on the capacity of the virtual node;

storing, in response to at least one task being allocated by the scheduling node to the virtual node, the at least one task in the virtual node, wherein the virtual node does not process the at least one task; and processing, in response to at least one task being allocated by the scheduling node to the group of actual computing nodes, the at least one task by the group of actual computing nodes.

8. The computer program product of claim 7, wherein when the at least one task is stored by the virtual node, re-allocating the at least on task to the group of actual computing nodes by the scheduling node.

9. The computer program product of claim 7, wherein setting the capacity of the virtual node based on the obtained performance level of the computing system meeting the criterion comprises:

setting, in response to the obtained performance level of the computing system meeting a first criterion indicating a low performance level of the group of actual computing nodes, a strong capacity to the virtual node, wherein in response to setting the strong capacity the scheduling node allocates tasks to the virtual node.

10. The computer program product of claim 7, wherein setting the capacity of the virtual node based on the obtained performance level of the computing system meeting the criterion comprises:

requesting, in response to the obtained performance level of the computing system meeting a second criterion indicating a normal performance level of the group of actual computing nodes and at least one task being held in the virtual node, the scheduling node to re-allocate the at least one task from the virtual node to the group of actual computing nodes, wherein responsive to the requesting, the scheduling node reallocates the at least one task from the virtual node to the group of actual computing nodes.

11. The computer program product of claim 7, wherein setting the capacity of the virtual node based on the obtained performance level of the computing system meeting the criterion comprises:

setting, in response to the obtained performance level of the computing system meeting a third criterion indicating a high performance level of the group of actual computing nodes and no task being held in the virtual node, a weak capacity to the virtual node, wherein in response to setting the weak capacity, preventing tasks from being allocated to the virtual node by the scheduling node.

12. The computer program product of claim 7, wherein the average response time of the group of actual computing nodes is a time duration between a starting time when the computing system receives a task and an ending time when the scheduling node allocates the received task to at least one actual computing node and the at least one actual computing node finishes processing the received task.

\* \* \* \* \*